JAMES BAIRD HANDYSIDE.
Improvement in Railway Car Wheels.
No. 120,432.   Fig. 1.   Patented Oct. 31, 1871.
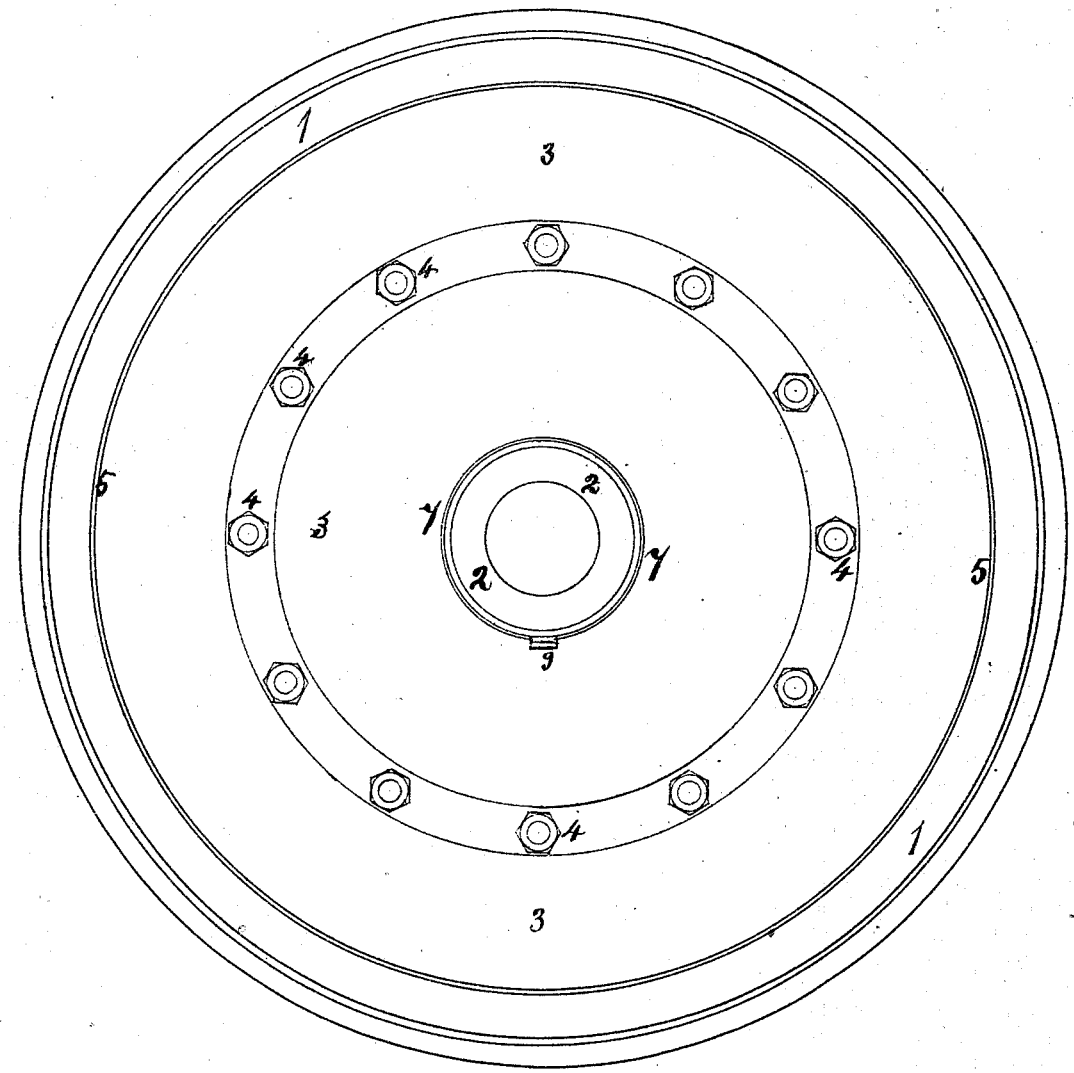
Fig. 2.
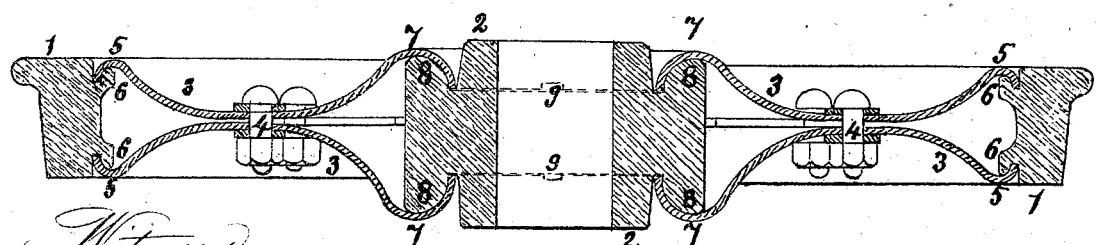
Witnesses:
Martin Luscombe
Chas. A. Moore
James Baird Handyside
by his atty. E. H. Ashcroft

UNITED STATES PATENT OFFICE.

JAMES BAIRD HANDYSIDE, OF GLASGOW, GREAT BRITAIN.

IMPROVEMENT IN RAILWAY-CAR WHEELS.

Specification forming part of Letters Patent No. 120,432, dated October 31, 1871.

*To all whom it may concern:*

Be it known that I, JAMES BAIRD HANDYSIDE, of Glasgow, in the county of Lanark and Kingdom of Great Britain and Ireland, have invented an Improvement in Wheels, of which the following is a specification:

My invention relates to a kind of wheel the hub and tire of which are connected by a pair of curved disks or annular plates; and consists in shaping and applying such disks so as to be fixed to the hub by grasping between them suitably-formed parts thereof, whereby I obtain a more safe, elastic, durable, and economical wheel than those of ordinary construction, such improved wheel being more especially suitable for railways, although not restricted to that application.

Figure 1 is a face view or elevation of my improved wheel. Fig. 2 is a section thereof, as by a plane passing through the axis.

The drawing shows my improved wheel as made suitably for railways. The tire 1 is connected to the hub 2 by a pair of annular plates or disks, 3, which are themselves fixed to each other by an annular series of screw-bolts, 4, or rivets, (or, if preferred, by two such series of bolts or rivets.) The outer portions 5 of the annular plates 3 are shaped convexly, as viewed externally, to grasp the tire 1, by fitting upon conformate ribs 6, formed for the purpose on the inner part of the tire. The inner or eye portions 7 of the annular plates 3 are shaped convexly, to grasp the hub 2 by fitting upon conformate ribs 8, formed for the purpose on the outer part of the hub. The plates 3 are shaped concavely at the parts where the bolts 4 are applied, and I prefer to interpose rings, as shown, between the plates and the bolt-heads and nuts, although this is not essential. The bolts 4 are screwed up sufficiently to put a spring-tension on the plates 3 in order that these may grasp the tire and hub the more firmly, but, by preference, not so much as to bring them into actual contact with each other at their concave parts, where the bolts are applied. The parts of the tire 1 and hub 2, on which the plates 3 fit, are made concentric with the axis of the wheel, (and not slightly eccentric thereto, as formerly proposed by me.) I now believe that the contact surfaces at the tire are too great to admit of the tire slipping round between the plates; and I think it probable that the contact-surfaces at the hub are sufficiently great to prevent the plates slipping round on the hub. If, however, it should by others be considered likely that the plates will tend to slip round on the hub, such tendency may be very easily prevented from taking effect by forming one or more notches, 9, (indicated by dotted lines in Fig. 2,) in the edge of each plate 3 at its eye, to fit on corresponding projections or keys formed or fixed in the channel or groove in the hub 2, into which the edge of the plate is entered.

I do not, in this present application for Letters Patent, claim the mode herein described of grasping or holding the tire 1 between the convex parts 5 of the annular plates 3.

I claim—

The connecting of the tire and the hub of a wheel by a pair of annular plates bolted together, when such plates are shaped and made to grasp between them ribs formed on the hub and tire or periphery of the wheel, as herein set forth.

JAMES BAIRD HANDYSIDE.

Witnesses:
EDMUND HUNT,
ALEXANDER CALDERHEAD. (122)